April 21, 1936.  G. H. ROESCH  2,038,450
POWER TRANSMISSION MECHANISM
Filed Dec. 14, 1934  2 Sheets-Sheet 1
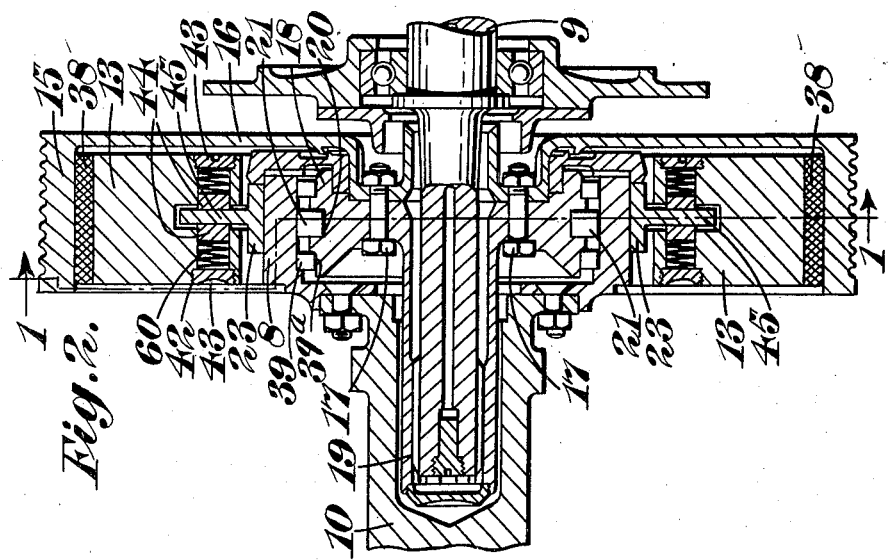
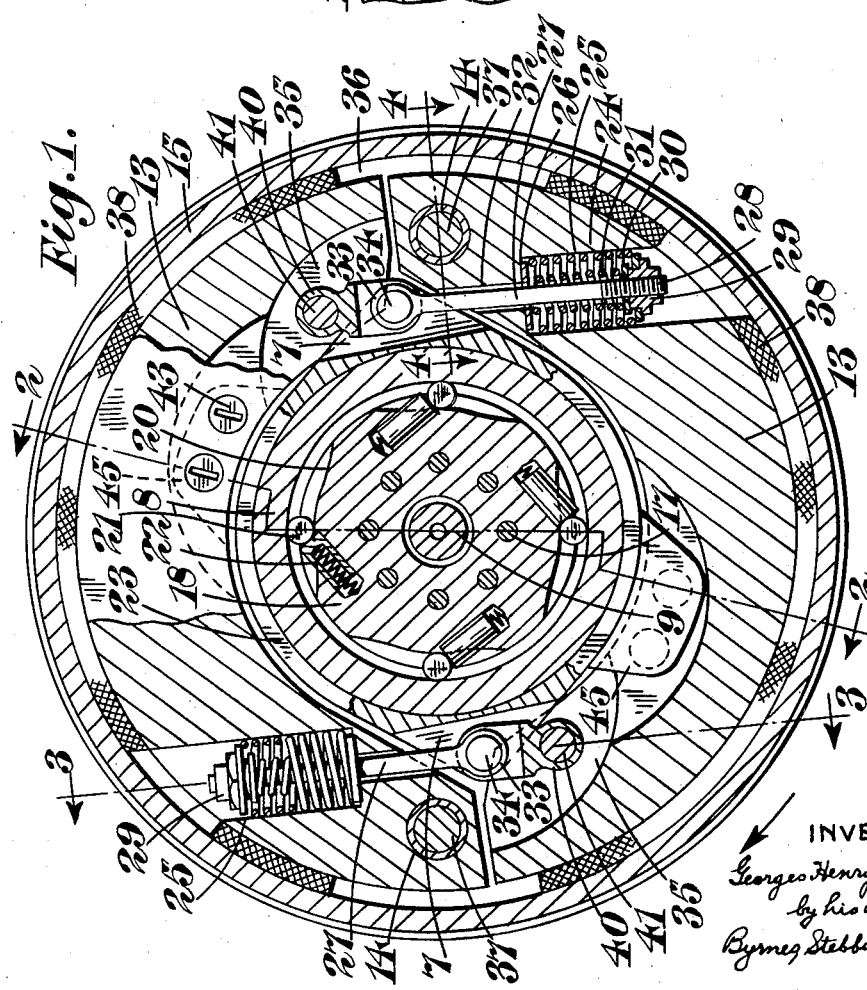
INVENTOR
Georges Henry Roesch
by his atty's
Byrnes Stebbins + Blenko April 21, 1936.　　　　G. H. ROESCH　　　　2,038,450
POWER TRANSMISSION MECHANISM
Filed Dec. 14, 1934　　　2 Sheets-Sheet 2
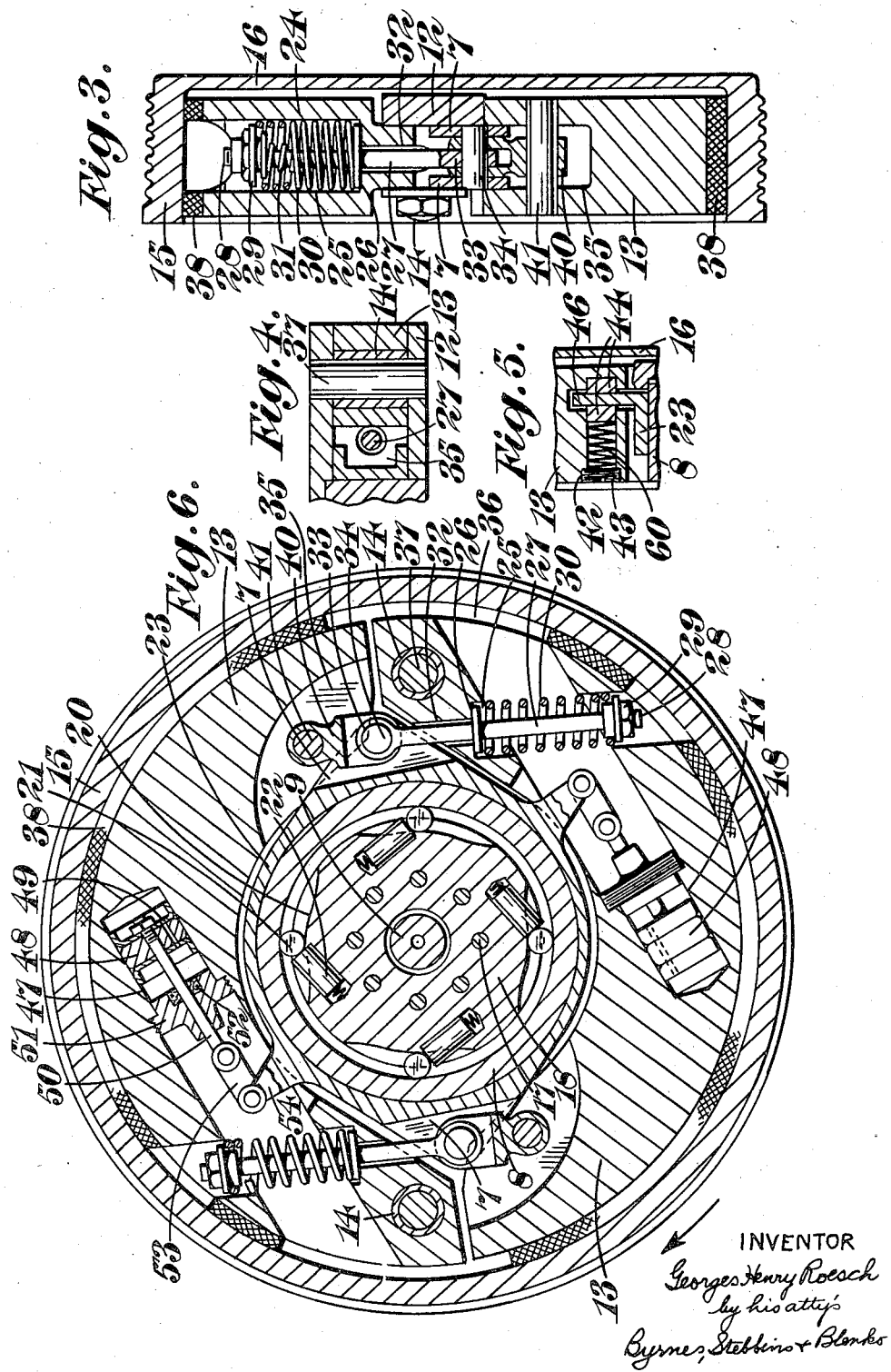

Patented Apr. 21, 1936

2,038,450

UNITED STATES PATENT OFFICE 2,038,450

POWER-TRANSMISSION MECHANISM

Georges Henry Roesch, London, England, assignor of one-half to Clement Talbot Limited, London, England, a British company Application December 14, 1934, Serial No. 757,492
In Great Britain August 11, 1933

6 Claims. (Cl. 192—48)

This invention is for improvements in or relating to power-transmission mechanism particularly for motor vehicles and has for an object to provide an arrangement in which the engine only becomes coupled to the road wheels at a preselected engine speed.

According to this invention, a power-transmission mechanism comprises a driving connection between two parts, either of which is adapted to drive the other, which driving connection comprises two coupling devices which are adapted to operate respectively according as to which part is capable of driving the other, and one of which coupling devices comprises a number of centrifugally controlled friction shoes mounted on one of said parts, means for positively interconnecting said friction shoes so as to equalize their movements and a friction member on the other part adapted to be engaged by said shoes. The said shoes may be mounted on the driving shaft of the engine, while the friction member may be connected to the driven shaft. It will be appreciated that although the shaft connected to the engine is termed a "driving shaft" and the gear box shaft is termed a "driven shaft" when the vehicle driving wheels overrun the engine, the functions of the above shafts are reversed.

A feature of the invention consists in that the second coupling means may comprise a one-way drive mechanism (e. g. a free-wheel clutch) so arranged as to prevent the gear box overrunning the driving shaft, wherein the driving member of the speed governed coupling is connected to one of the rotating members of the free-wheel, while the driven member of said coupling is connected to the other rotating member of the free-wheel clutch. It will be appreciated with this arrangement that when the vehicle is stationary and when the engine is running slowly, the speed governed coupling means will be inoperative and the gear-box will not be driven. On the other hand, when the engine is running slowly, while the vehicle is in motion and when the road wheels tend to overrun the engine, the one-way drive mechanism will become engaged, whereby the engine may act as a brake.

In an arrangement embodying a centrifugal clutch, a feature of the invention consists in that said centrifugal clutch comprises one or more friction shoes pivotally secured to said engine shaft so as to swing about axes parallel to and offset from the axis of said engine shaft, which shoes are arranged to engage a drum connected to the driving shaft of the gear box (in this way the shoes are engageable with a friction member connected directly to a rotating member of the free-wheel clutch).

A still further feature of the invention consists in that said shoes are segmental in shape and are arranged to engage the inner circumferential face of said drum and are pivotally mounted near their trailing edges, in respect to the rotation of the mechanism, about axes disposed radially inwards from the engaging faces. It will be appreciated with this arrangement that when the shoes are in engagement with the drum, any increase of torque transmitted between the shoes and the drum tends to tilt the shoes about their axes in a direction to increase their engagement.

Other features of the invention include arranging the free-wheel and centrifugal clutches concentrically one within the other and positively interconnecting said shoes so as to equalize their movement.

The following is a description of a number of embodiments of the invention, reference being made to the accompanying drawings, in which—

Figure 1 is a cross-section through a combined centrifugal and one-way clutch in a plane transverse to the axis of rotation, the section being indicated in Figure 2 by the line 1—1;

Figure 2 is a section on the line 2—2 of Figure 1;

Figure 3 is a section on the line 3—3 of Figure 1;

Figure 4 is a sectional plan on the line 4—4 of Figure 1;

Figure 5 is a fragmentary view of a section similar to that shown in Figure 2, and showing an alternative form of friction damping means; and Figure 6 is a similar view to Figure 1, but showing dash-pot mechanism for damping out vibrations.

Like reference numerals refer to like parts throughout the figures of the drawings.

In the construction shown in the drawings, the combined centrifugal clutch and free-wheel clutch is connected between the engine crankshaft 10 and the driving shaft 9 of the gearbox. The crankshaft has secured to it both an outer drum member 8 of the free-wheel clutch and also a carrier 12 for two centrifugal friction shoes 13. The shoes are pivotally mounted at 14 on the carrier and are arranged under centrifugal action to engage with an outer drum 15. The end wall 16 of the drum is bolted by bolts 17 to the inner member 18 of the free-wheel clutch. The inner member of the free-wheel clutch is formed with a splined sleeve 19 which is arranged to engage the driving shaft of the gear-box.

The free-wheel clutch is of the known wedge and roller type, as seen in Figures 1 and 2, and particularly in Figure 1. The inner clutch member 18 is provided with a number of facets 20 and rollers 21 are disposed between these facets and the outer drum member 8. The rollers are urged towards the outer drum member by spring plungers 22 which are mounted in the member 18 so that the axis of each plunger is inclined to a line joining the centre of the clutch with the roller with which the plunger co-operates.

A sleeve member 23 is arranged to encircle the outer member of the free-wheel clutch and is provided with two diametrically disposed lugs 7. This sleeve is arranged to interconnect the centrifugal shoe members so that the extent and speed of movement of these members are identical in the manner set out below. Each shoe is provided with a wall 24 which has formed in it near its pivot point 14 a housing 25. The housing is provided with a shoulder 26 at its inner end but is open at its outer end. A connecting rod 27 is arranged to extend into the housing and is externally threaded at 28 at that end thereof within the housing and carries a screw-cap member 29. Two helical compression springs 30 and 31 are located between the cap member and said shoulder 26. The connecting rod is arranged to extend out through the inner end of the housing, through an aperture 32 in the shoe 13 and has formed at its end en eye 33. The eye 33 is arranged to engage a pin 34 which is rotatably mounted in the lug 7. The lug is connected to the other friction shoe by a link 40 which at one end engages the pin 34 and at the other a pin 41 mounted in said other friction shoe. It will be appreciated with this arrangement that outward radial movement of the shoes due to centrifugal force will be positively communicated to one another through the link and the sleeve connected thereto. The compression springs operate to hold the shoes in disengaged position below the preselected engine speed.

There may be a tendency for the friction shoes to chatter or vibrate when in the act of engaging the drum 15. This chattering or vibration is overcome by arranging the outward radial movement of the shoes to be resisted. In the construction shown in Figure 2, this resistance is provided by frictional means which comprise friction pads 44 mounted in each friction shoe and arranged one on each side of a lug 45 formed on the sleeve 23. These friction pads are arranged in holes 42 formed in the friction shoes and forced into engagement with the lugs by springs 60. The springs are retained in the holes by means of plugs 43 which are externally threaded and engage internal threads at the ends of said holes. With this arrangement the outward radial movement of the friction shoes is resisted by reason of the frictional engagement of the friction pads 44 on the lugs 45. Whereas in the construction shown in Figure 2, the lug 45 is centrally disposed in relation to the sleeve 23, in a modified form of construction the lugs may be formed to one side of the sleeve and a single spring-pressed pad 44 may be disposed on one side of said lug, whereas a fixed pad is arranged on the other side as shown in Figure 5.

In the construction shown in Figure 6, the outward radial movement of the friction shoes is resisted by a dash-pot arrangement. In this construction a cylinder 47 is formed in each friction shoe 13 and a piston 48 having a bleed orifice 49 therein is reciprocably mounted in the cylinder. A piston rod 50 secured to said piston extends out through a stuffing box 51 having a sealing ring 52 therein, which stuffing box is formed in a cap which is screw threaded into said cylinder. The piston rod 50 is secured to a lug 54 on the sleeve 23 by means of a link 53.

In each construction the shoes are solid and of the same width throughout except for the aforesaid housing 25 and except for recesses 35 at their free ends which are cut away so as to permit the movement of the aforesaid eye 33. The outer circumference of the shoes is covered with material 38 such as commonly used for brake lining. The pivoted ends of the shoes are reduced in width and are arranged to project into recesses 36 formed in said carrier 12 and are retained in said recesses by pivot pins 37 which are arranged to extend through holes formed in the walls of the recesses and in the reduced ends of the shoes. It will be noted from the arrow denoting the direction of rotation of the apparatus that the friction shoes are pivotally mounted at their trailing ends, and as already indicated earlier in the specification, since the pivots are disposed radially inwards from the engaging faces of the shoes, an increase to torque transmitted through the shoes to the drum tends to increase their engagement. It will be appreciated that the friction shoes may alternatively be pivoted at their leading edges.

As already indicated above, the inner member of the free-wheel clutch is provided with a number of facets 20. Disposed on each side of the ring of facets is a cylindrical runway 39a and rollers 39 are disposed between these run-ways and the outer cylindrical member 8 of said clutch and thus constitute a bearing for that outer member.

I claim:—

1. A power-transmission mechanism for a motor vehicle having an engine driving shaft and a driven shaft connected to a gear box comprising two coupling devices arranged between the driving shaft of the vehicle engine and a driven shaft connected to the gear box, one of which coupling devices comprises a plurality of centrifugally controlled friction shoes mounted on the driving shaft, and a friction member adapted to be engaged by said shoes mounted on the driven shaft, the other of which coupling means comprises inner and outer race members concentrically arranged within said friction shoes, which race members form between them wedge shaped spaces, rotating members located in said spaces, means for positively interconnecting said shoes, which means comprise a sleeve rotatably mounted on the outer race member, and links connecting said sleeve to said friction shoes.

2. Clutch mechanism for connecting the engine driving shaft and a driven shaft connected to the gear box of a motor vehicle comprising a plurality of friction shoes pivotally connected to one of said shafts for swinging by centrifugal force on axes parallel to and offset from the axis of rotation of said shaft, and a friction member adapted to be engaged by said shoes connected to the other shaft, and means adapted to damp out oscillations which may be set up in said shoes during their engagement with the friction member and means for positively interconnecting said friction shoes so as to equalize their movement.

3. Clutch mechanism for connecting the engine driving shaft and a driven shaft connected to the gear box of a motor vehicle comprising a plurality of friction shoes pivotally connected on one of said shafts for swinging by centrifugal force on axes parallel to and offset from the axis of rotation of said shaft, a friction member adapted to be engaged by said shoes and secured to the other said shaft and means for damping out vibrations set up in said shoes in the act of engaging said friction member and means for positively interconnecting said friction shoes so as to equalize their movement.

4. Clutch mechanism for connecting the engine driving shaft and a driven shaft connected to the gear box of a motor vehicle comprising a plurality of centrifugally controlled friction shoes movably mounted on one of said shafts, a friction member adapted to be engaged by said shoes and secured to the other said shaft, and means connecting a part of each said shoe and a part rotating with the shaft on which the shoes are mounted for yieldingly opposing vibrations set up in said shoes so as to damp out such vibrations set up in said shoes in the act of engaging said friction member and means for positively interconnecting said friction shoes so as to equalize their movement.

5. Clutch mechanism for connecting the engine driving shaft and a driven shaft connected to the gear box of a motor vehicle comprising a plurality of centrifugally controlled friction shoes movably mounted on one of said shafts, a friction member adapted to be engaged by said shoes and secured to the other said shaft, a plurality of damping elements rotating with the shaft on which the shoes are mounted and each having friction surfaces adapted to be engaged by a friction face on one of said shoes, which friction faces are so disposed as to resist the engaging movement of the shoes with said friction member and means for positively interconnecting said friction shoes so as to equalize their movement.

6. Clutch mechanism for connecting the engine driving shaft and a driven shaft connected to the gear box of a motor vehicle comprising a plurality of centrifugally controlled friction shoes movably mounted on one of said shafts, a friction member adapted to be engaged by said shoes and secured to the other said shaft, a dash-pot connection between each shoe and a part rotating with the shaft on which the shoes are mounted adapted to damp out the vibrations set up in said shoes in the act of engaging said friction member and means for positively interconnecting said friction shoes so as to equalize their movement.

GEORGES HENRY ROESCH.